United States Patent [19]
Richter et al.

[11] Patent Number: 6,100,326
[45] Date of Patent: Aug. 8, 2000

[54] USE OF SPECIAL ISOCYANATES FOR PREPARING AQUEOUS POLYURETHANE COATINGS

[75] Inventors: Frank Richter, Leverkusen; Michael Sonntag; Reinhard Halpaap, both of Odenthal; Manfred Bock, Leverkusen, all of Germany

[73] Assignee: Bayer Aktiengesellschaft, Leverkusen, Germany

[21] Appl. No.: 09/225,762

[22] Filed: Jan. 5, 1999

[30] Foreign Application Priority Data

Jan. 7, 1998 [DE] Germany .......................... 198 00 286

[51] Int. Cl.⁷ .............................. C08J 3/00; C08K 3/20; C08L 75/00
[52] U.S. Cl. ........................... 524/591; 524/839; 524/840
[58] Field of Search ..................................... 524/591, 839, 524/840

[56] References Cited

U.S. PATENT DOCUMENTS

| | | | |
|---|---|---|---|
| 4,314,048 | 2/1982 | Doi et al. | 528/44 |
| 5,075,370 | 12/1991 | Kubitza et al. | 524/591 |
| 5,252,696 | 10/1993 | Laas et al. | 528/49 |

FOREIGN PATENT DOCUMENTS

| | | |
|---|---|---|
| 2090144 | 8/1993 | Canada . |
| 42 26 270 | 2/1994 | Germany . |

OTHER PUBLICATIONS

Farbe & Lack, 102nd issue, Mar. 1996, pp. 88–100.
Patent Abstracts of Japan, vol. 095, No. 011, Dezember 26, 1995 & JP 07 228651 A (Asahi Chem Ind Co Ltd), Aug. 29, 1995.
Patent Abstracts of Japan, vol. 096, No. 010, Oktober 31, 1996 & JP 08 151358 A (Asahi Chem Ind Co Ltd), Juni 11, 1996.
Database WPI, Section Ch, AN 83–06196K, XP002099538, & JP 57 198761 A (Ahasi Chem Ind Co Ltd), Dezember 6, 1982.

*Primary Examiner*—Patrick D. Niland
*Attorney, Agent, or Firm*—Joseph C. Gil; Diderico Van Eyl; Thomas W. Roy

[57] ABSTRACT

The invention relates to the use of 4-isocyanatomethyloctane 1,8-diisocyanate isocyanatononane, (TIN) and TIN-containing mixtures for preparing polyurethane lacquers and coatings which can be applied from an aqueous medium.

17 Claims, No Drawings

USE OF SPECIAL ISOCYANATES FOR PREPARING AQUEOUS POLYURETHANE COATINGS

FIELD OF THE INVENTION

The invention relates to the use of 4-isocyanatomethyloctane-1,8-diisocyanate (triisocyanatononane, TIN) and TIN-containing mixtures for preparing polyurethane lacquers and coatings which can be applied from an aqueous medium.

BACKGROUND OF THE INVENTION

The preparation and use of water-dispersible polyisocyanates, i.e., isocyanates with at least two NCO groups in the molecule, is well-known (see EP-A 540,985 and documents cited therein). They are gaining increasing economic importance for the preparation of lacquers and coating agents based on polyurethane which emit a substantially lower proportion of volatile organic components (VOC), in particular solvents, during application. Due to their low tendency to become yellow under the influence of light, representatives which contain exclusively (cyclo) aliphatically bonded NCO groups are gaining particular importance for the preparation of high quality lacquer raw materials and coating agents.

A variety of substances and methods are available for dispersing in water those polyisocyanates which are hydrophobic, per se, and react with water, these being known from "classical" two-component technology, i.e., those normally requiring substantially non-aqueous conditions.

Thus, it is possible to disperse classical polyisocyanate hardeners, e.g., derivatives of aliphatic diisocyanates such as hexamethylene diisocyanate (HDI), isophorone diisocyanate (IPDI) or hydrogenated 4,4'-diphenylmethane diisocyanate ($H_{12}$MDI, Desmodur® W=a commercial product from Bayer AG) in water by using extremely high shear forces. The last two compounds mentioned, however, always require the use of solvents since the 100% solids systems are solids or highly viscous oils. These dispersions produce high quality coatings which are substantially equal to those which result from the use of non-aqueous processing technologies (see L. Kahl, M. Bock, E. Jürgens and H. -J. Laas in "Farbe und Lack", 102nd issue, March 1996, pages 88–100 and literature cited therein).

The disadvantage of these is the cost of the nozzle jet dispersion process since these technologies are not available in all fields of application, in particular car repair lacquering.

On the other hand, according to the disclosure in EP-A 540,985, the chemical incorporation of hydrophilic components into the above-mentioned classical polyisocyanate hardeners has been proposed in order to overcome the hydrophobic nature of these species which cannot be directly dispersed under the effect of low shear forces (e.g., stirring in by hand). The incorporation of these hydrophilic components, however, often takes place by using the free NCO groups in the polyisocyanate (e.g., by urethenization with specific, e.g., monofunctional, polyethers). Thus the provision of hydrophilic characteristics is naturally associated with a lowering of the NCO functionality of the polyisocyanate hardener and therefore a drop in the concentration of valuable NCO groups which are available for cross-linking to the substrate.

Furthermore, polyisocyanates have also been rendered hydrophilic by adding so-called "external" emulsifiers (e.g., EP-A 557,844 and documents cited therein). Apart from the economic disadvantage of an additional process step, this method involves the critical disadvantage that the external emulsifiers used have to remain in the lacquer film and tend to affect its physical properties disadvantageously, e.g., due to so-called "sweating," due to the higher degree of hydrophilicity and, resulting from that, a greater sensitivity of the lacquer or coating towards the effects of water, odor problems due to the frequently intense and unpleasant intrinsic odor of the emulsifiers or of the products formed from it, etc.

It is known that the viscosity of (poly)isocyanates is connected with their water dispersibility (e.g., EP-A 0,358, 979). That is, low viscosity should generally lead to better dispersibility. However, this relationship is not generally applicable as can be seen from a few comparative trials (1.c. Example 1).

Also, explicit reference is made for example in EP-A 0,358,979 (p.2,line 54 to p.3, line 1) that the NCO-reactive components, and the optional auxiliary substances and additives which are used, have to be present before adding the isocyanate component to the aqueous polymer solution and/or dispersion. Thus, it can be assumed that these auxiliary substances and additives do not have an uncritical effect on the dispersibility of the polyisocyanate which itself is not water dispersible in the absence of additives.

The object of the present invention is to provide water-dispersible polyisocyanates or polyisocyanate mixtures which are characterized by ease of incorporation, even at low shear forces (e.g., "stirring by hand"), and which contain no hydrophilic additives.

SUMMARY OF THE INVENTION

The object of the invention is achieved by the use of 4-isocyanatomethyloctane-1,8-diisocyanate (triisocyanatononane, in the following called TIN) or TIN-containing mixtures with other lacquer polyisocyanates known, per se, from the prior art. More specifically, the invention is directed to a method-for making an aqueous polyurethane lacquer composition, the isocyanate component used to make the lacquer composition, and coatings made from the lacquer composition.

DETAILED DESCRIPTION OF THE INVENTION

The invention is based on the surprising observation that 4-isocyanato-methyloctane-1,8-diisocyanate (triisocyanatononane, or TIN) can be readily dispersed in water even without the use of high shear forces or hydrophilic additives and, in addition, is capable of "incorporating" a certain amount of other polyisocyanates of the above-mentioned type which are hydrophobic, per se, in the aqueous dispersion or emulsion.

As such, the present invention provides the use of 4-isocyanatomethyloctane-1,8-diisocyanate (triisocyanatononane, TIN) to prepare aqueous polyurethane lacquers and coatings. The present invention also provides corresponding use of TIN mixed with other isocyanate group-containing conventional polyisocyanates from the group of biurets, uretdiones ("dimers"), allophanates and isocyanurates, iminooxadiazinediones ("trimers") of hexamethylene diisocyanate, isophorone diisocyanates, hydrogenated diphenylmethane diisocyanates and other, optionally cyclic, aliphatic diisocyanates, wherein the proportion of conventional polyisocyanate in the mixtures used according to the invention does not exceed 50 wt. %.

TIN can be prepared from the parent triamine, optionally, after conversion into a derivative which is easier to

USE OF SPECIAL ISOCYANATES FOR PREPARING AQUEOUS POLYURETHANE COATINGS

EP-A 557,844 and documents cited therein). Apart from the economic disadvantage of an additional process step, this method involves the critical disadvantage that the external the only critical parameter for good water dispersibility since the isocyanates from Examples 1, 2 and 3 have approximately the same low viscosity (up to 10 mPa·s), the degree of inaccuracy of the measurement of the method described at the beginning is too great in this range for them to be differentiated any further, and for the same reason only an upper limit is quoted for the viscosity of the mixtures used in Experiments 6 and 7).

Example 2

With Comparison Examples

The use of pure TIN (according to the invention, Formulation 3) and TIN mixed with an HDI trimer polyisocyanate (Desmodur® VP LS 2025/1, product of Bayer AG, called LS 2025/1 in the following, according to the invention, Formulation 4) in aqueous lacquers as compared with products from the prior art (pure LS 2025/1 without added TIN, comparison example, Formulation 1) and a hydrophilic modified polyisocyanate (Bayhydur® 3100 from Bayer AG, called 3100 in the following, comparison example, Formulation 4).

A polyacrylate in accordance with DE-A 3,829,587 (Bayhydrol® VP LS 2235, product of Bayer AG), which is suitable for use in aqueous two-component PUR lacquers was used as the polyol component (binder) in all the formulations.

| Formulation # | 1 | 2 | 3 | 4 |
|---|---|---|---|---|
| Desmodur ® | LS 2025/1 | — | TIN | LS 2025/1 + TIN(1:1) |
| Bayhydur ® 80% in Proglyde ® DMM[1] | — | 3100 | — | — |
| Component 1 | —> | —> | —> | —> |
| Bayhydrof ® VP LS 2235 | 64.14 | 58.28 | 67.51 | 67.51 |
| Surfynol ® 104[2] 50% BG | 1.24 | 1.21 | 1.16 | 1.2 |
| Borchigel ® PW 25[3] 25% PG/H$_2$O | 0.08 | 0.08 | 0.08 | 0.08 |
| Baysilone ® OL 31[4] 10% BG | 1.0 | 1.0 | 1.0 | 1.0 |
| Demin. H$_2$O for flow time DIN 6 = 50" | — | — | — | — |

[1]dipropyleneglycoldimethylether, product of the Dow Chemical Co.
[2]commercial substrate wetting agent, product of the Air Products Co.
[3]commercial thickener, product of the Borchers Co.
[4]commercial slip additive, product of Bayer AG

| Formulation # | 1 | 2 | 3 | 4 |
|---|---|---|---|---|
| Component 2 | | | | |
| Hardener, 80% strength | 12.59 | 15.63 | 9.46 | 11.35 |
| Water for spray viscosity | 20.95 | 23.80 | 20.79 | 18.86 |
| Total | 100.0 | 100.0 | 100.0 | 100.0 |
| Spray dilution | H$_2$O | H$_2$O | H$_2$O | H$_2$O |
| NCO:OH | 1.5 | 1.5 | 1.5 | 1.5 |
| Solids (wt. %) | 40.3 | 40.0 | 39.3 | 42.9 |
| Co-solvent (wt. %) | 9.04 | 9.18 | 8.64 | 9.04 |
| VOC g/l | 183 | 187 | 180 | 174 |
| Density (kg/l) | 1.0 | 1.0 | 1.0 | 1.0 |
| pH | 8.2 | 8.0 | 8.0 | 7.9 |

Aqueous 2-component PUR clear lacquer, hardener incorporation 30" 2000 rpm/Dissolver disc φ 40 mm for a dispersive volume of 500 g in a 1000 ml vessel (simulated "incorporation by hand")

| Formulation # | 1 | 2 | 3 | 4 |
|---|---|---|---|---|
| Bayhydrol ® VP LS 2235 | —> | —> | —> | —> |
| Desmodur ® | LS 2025/1 | — | TIN | LS 2025/1 + TIN (1:1) |
| Bayhydur ® | — | 3100 | — | — |
| Viscosity Comp. 1 DIN 6 (sec)/pH | 35/8.0 | 35/8.0 | 35/8.0. | 35/8.0 |
| Viscosity component 1 + 2 (DIN 4)//Ph//opacity (0–5) | | | | |
| Immediately | 15/7.8/5 | 16/7.9/3 | 15/8.0/1 | 16/8.1/4 |
| after 30 min | 15/8.1/4 | 16/7.9/0 | 15/7.9/0 | 16/7.9/0 |
| after 60 min | 15/8.0/4 | 15/7.8/0 | 17/7.7/0 | 18/7.7/0 |
| after 120 min | 15/7.8/4 | 15/7.8/0 | 19/7.5/0 | 20/7.4/0 |
| after 180 min | 16/7.5/4 | 15/7.5/0 | 22/7.3/0 | 25/7.3/0 |
| Drying (h) | | | | |
| T1 | 1.5 | 1.5 | 1 | 1.5 |
| T3 | 5 | 5 | 4 | 4.5 |

| Formulation # | 1 | 2 | 3 | 4 |
|---|---|---|---|---|
| Drying (0–5)30'60° C.// 30'60° C. + 1h | 2//0 | 2//0 | 1//0 | 1//0 |
| Turbidity (0–5)30'60° C.// 30'60° C. + 1h | 4//4 | 1//1 | 1//1 | 2//2 |
| Pendulum hardness (s) (RT = Room Temperature) | 57 | 23 | 39 | 49 |
|  | 69 | 36 | 53 | 69 |
| Pendulum hardness (s) 30'60° C. + 2h RT | 19 | 14 | 32 | 41 |
| + | 46 | 29 | 81 | 75 |
| + | 60 | 43 | 106 | 102 |
| Solvent resistance on ALU + base lacquer + clear lacquer[1] | | | | |
| 1d RT | 3344 | 3355 | 2233 | 2333 |
| 3d RT | 2343 | 2355 | 2222 | 2233 |
| 7d RT | 1233 | 1233 | 1121 | 1121 |
| 30'60° C. + 2h RT | 4555 | 4555 | 2344 | 2334 |
| + 1d RT | 2344 | 2344 | 1111 | 1111 |
| + 3d RT | 1233 | 1245 | 1000 | 1111 |
| + 7d RT | 1233 | 1233 | 0000 | 0011 |
| Solvent resistance on glass plate + clear lacquer (60 μm dry film)[1] | | | | |
| 3d RT | 3444 | 4455 | 4233 | 4344 |
| + 7d RT | 3333 | 4233 | 4121 | 4222 |
| 30'60° C. + 3d RT | 4444 | 4344 | 2222 | 2222 |
| + 7d RT | 3233 | 4233 | 1000 | 0000 |

| Formulation # | 1 | 2 | 3 | 4 |
|---|---|---|---|---|
| Alkali (A) and acid (S) resistance on ALU + base lacquer + clear lacquer | | | | |
| 5h A/S 3d RT | 1/1 | 1/1 | 1/1 | 1/1 |
| 5h A/S 7d RT | 1/1 | 1/1 | 1/1 | 1/1 |
| 5h A/S 30'60° C. + 3d RT | 1/2 | 1/2 | 1/1 | 1/1 |

-continued

| Formulation # | 1 | 2 | 3 | 4 |
|---|---|---|---|---|
| 5h A/S + 7d RT | 1/1 | 1/1 | 1/1 | 1/1 |
| Alkali and acid resistance on Glass plate + clear lacquer (60 μm dry film)[2)] | | | | |
| 1h//5h + 3d RT | 44//44 | 11//44 | 34//44 | 44//44 |
| 1h//5h + 7d RT | 44//- | 44//- | 44//- | 44//- |
| 16h + 7d RT | 21//- | 11//- | 11//- | 11//- |
| 1h//5h 30'60° C. + 3d RT | 41//43 | 44//44 | 21//32 | 33//33 |
| 1h//5h + 7d RT | 44//- | 44//- | 44//- | 44//- |
| 16h + 7d RT | 12//- | 12//- | 11//- | 11//- |
| Flow RT//30'60° C. | 3/3 | 2/1 | 0/0 | 1/1 |
| Visual gloss assessment | 2–3 | 2 | 0 | 1 |
| Gloss 20° RT | 89 | 92 | 91 | 91 |
| Haze RT | 37 | <20 | <20 | <20 |
| Gloss 20° 30'60° C. | 90 | 91 | 91 | 90 |
| Haze 30'60° C. | 24 | 24 | <20 | 30 |
| Flake | | tough, soft | tough, hard | averag. of 1 & 2 or 3 |

0 = positive//5 = negative
[1)]1h H$_2$O/5' super petrol/5' methoxypropyl acetate/5' xylene
[2)]2% caustic soda solution//2 % sulfuric acid Spraying: HVLP pistols // sprayed perpendicular to the surface // one spray process, 15 min. drying in air, second spray process, 30 min. drying in air, drying at room temperature or 30 min at 60° C.

The advantages of the use according to the invention are better emulsifiability, more rapid drying and higher degree of hardness of the coating produced (e.g., pendulum hardness, stability to weathering, resistance to solvents, etc).

Although the invention has been described in detail in the foregoing for the purpose of illustration, it is to be understood that such detail is solely for that purpose and that variations can be made therein by those skilled in the art without departing from the spirit and scope of the invention.

What is claimed is:

1. A method for making an aqueous polyurethane lacquer composition comprising the steps of:
   (a) forming an isocyanate component by dispersing 4-isocyanatomethyloctane 1,8-diisocyanate in water, wherein the 4-isocyanatomethyloctane 1,8-diisocyanate is homogeneously dispersed throughout the water; and
   (b) combining the isocyanate component with an isocyanate-reactive component.

2. The method of claim 1, wherein the 4-isocyanatomethyloctane 1,8-diisocyanate is mixed with a polyisocyanate comprising a component selected from the group consisting of isocyanurates based on 1,6-hexamethylene diisocyanate, iminooxadiazinediones based on 1,6-hexamethylene diisocyanate, biurets based on 1,6-hexamethylene diisocyanate, uretdione based on 1,6-hexamethylene diisocyanate-urethane pre-polymers based on 1,6-hexamethylene diisocyanate, and allophonates based on 1,6-hexamethylene diisocyanate, wherein the 4-isocyanatomethyloctane 1,8-diisocyanate is present in an amount that is at least 50 wt. %, based on the weight of the polyisocyanate component.

3. The method of claim 1 wherein the 4-isocyanatomethyloctane 1,8-diisocyanate is mixed with a polyisocyanate comprising a component selected from the group consisting of isocyanurates based on isophorone diisocyanate, iminooxadiazinediones based on isophorone diisocyanate, biurets based on isophorone diisocyanate, uretdione based on isophorone diisocyanate, urethane pre-polymers based on isophorone diisocyanate, and allophonates based on isophorone diisocyanate, wherein the 4-isocyanatomethyloctane 1,8-diisocyanate is present in an amount that is at least 50 wt. %, based on the weight of the polyisocyanate component.

4. The method of claim 1 wherein the 4-isocyanatomethyloctane 1,8-diisocyanate is mixed with a polyisocyanate comprising a component selected from the group consisting of isocyanurates based on hydrogenated diphenylmethane diisocyanate, iminooxadiazinediones based on hydrogenated diphenylmethane diisocyanate, biurets based on hydrogenated diphenylmethane diisocyanate, uretdione based on hydrogenated diphenylmethane diisocyanate, urethane pre-polymers based on hydrogenated diphenylmethane diisocyanate, and allophonates based on hydrogenated diphenylmethane diisocyanate, wherein the 4-isocyanatomethyloctane 1,8-diisocyanate is present in an amount that is at least 50 wt. %, based on the weight of the polyisocyanate component.

5. The method of claim 1 wherein the 4-isocyanatomethyloctane 1,8-diisocyanate is dispersed in the water under low shear conditions.

6. The method of claim 5 wherein the 4-isocyanatomethyloctane 1,8-diisocyanate is dispersed without any hydrophilic agents.

7. The composition of claim 1.

8. A method for making an isocyanate component for a two component aqueous polyurethane lacquer composition comprising mixing a 4-isocyanatomethyloctane 1,8-diisocyanate component in water to homogeneously disperse throughout the 4-isocyanatomethyloctane 1,8-diisocyanate component throughout the water.

9. The method of claim 8, wherein the 4-isocyanatomethyloctane 1,8-diisocyanate is mixed at low shear conditions.

10. The method of claim 8, wherein the 4-isocyanatomethyloctane 1,8-diisocyanate is mixed without a hydrophilic agent.

11. The method of claim 8, wherein after the 4-isocyanatomethyloctane 1,8-diisocyanate component is homogeneously dispersed in the water, the 4-isocyanatomethyloctane 1,8-diisocyanate component remains homogeneously dispersed for at least 5 minutes.

12. The method of claim 8, wherein the water contains a hydrophilically-modified isocyanate-reactive component.

13. The isocyanate component of claim 8.

14. A method for making an isocyanate component for a two-component aqueous polyurethane lacquer composition comprising mixing a 4-isocyanatomethyloctane 1,8-diisocyanate component under low shear conditions in water without an appreciable amount of a hydrophilic agent to homogeneously disperse throughout the 4-isocyanatomethyloctane 1,8-diisocyanate component throughout the water;
   wherein the 4-isocyanatomethyloctane 1,8-diisocyanate component remains homogeneously dispersed for at least 5 minutes after being homogeneously dispersed in the water.

15. The method of claim 14 further comprising the step of mixing the isocyanate component with an Isocyanate-reactive component to form a two-component composition.

16. The isocyanate component of claim 14.

17. The two-component composition of claim 15.

* * * * *